United States Patent [19]

Ackerman

[11] 3,827,219

[45] Aug. 6, 1974

[54] DETASSELING APPARATUS

[76] Inventor: Joseph A. Ackerman, Rural Rt. 3, Carmi, Ill. 62821

[22] Filed: June 25, 1973

[21] Appl. No.: 373,183

[52] U.S. Cl.................................. 56/53, 56/13.5
[51] Int. Cl........................................... A01d 45/02
[58] Field of Search.................. 56/51, 53, 56–59, 56/63, 11.9, 13.5

[56] References Cited
UNITED STATES PATENTS

| | | | |
|---|---|---|---|
| 2,163,849 | 6/1939 | Pfister | 56/13.5 |
| 2,397,249 | 3/1946 | Dostal | 56/11.9 |
| 3,524,308 | 8/1970 | Spry | 56/51 |
| 3,769,782 | 11/1923 | Cler | 56/51 |

*Primary Examiner*—Russell R. Kinsey

[57] ABSTRACT

The present invention relates to an apparatus for removal of tassels from corn and like plants. The apparatus is self-powered and mountable with a conventional hydraulic frame on farm implements. The apparatus consists of a belt feeder system to direct the upper portion of the plant stalk into a tassel severing means. The tassel severing means consists of two co-operating conical rollers adjustably inclined downwardly from the belt feeder system to the mounting means of said conical rollers. The rollers cooperate to sever the plant tassel from the plant stalk. The apparatus has a slotted shield below said roller severing means to depress and separate the leaves of the lower portion of the plant stalk from the plant tassel to be severed.

3 Claims, 8 Drawing Figures

3,827,219

DETASSELING APPARATUS

INTRODUCTION

Reference is made to a disclosure document filed with the U.S. Patent Office on June 24, 1971, and accorded Disclosure Document No. 5,718. The disclosure of the invention therein, contains substantially all the material elements of the invention disclosed herein, save for the modification of the tassel belt feeder means.

The present invention generally relates to a new and improved apparatus for the severance of the tassels from corn and like plants. In the development of hybrid strains of plants which contain both the male and female reproduction means, it is necessary to sever the male reproduction means to prevent cross pollination, thus allowing pollination by the desired pollen species for development of the new hybrid strain. The severance of the male reproduction means or tassel of the plant has had to be accomplished by hand or alternatively by mechanical means which have a tendency to injure the upper portion of the plant stalk and leaves. The invention described herein sets forth an apparatus for the efficient mechanical removal of the tassel portion of the plant without injury to the lower portion of the plant stalk.

SUMMARY OF THE INVENTION

The object of the present invention is to provide an efficient mechanical means for the severance of tassels from corn and like plants. The apparatus may be mounted on a conventional hydraulic frame and attached to any suitable farm implement. The invention comprises a flat feeder belt and pulley system to guide the upper portion of the tasseled plant stalk into the tassel severing means. The tassel severing means consists of two downwardly inclined cooperating conical rollers. The rotation of the conical rollers, and the increased inches per unit time rotation of said rollers as the tassel passed between said rollers, pulls the tassel from the upper portion of the plant. The conical rollers are partially surrounded by a shield which serves both a safety function and to depress and separate the leaves on the upper portion to prevent entrainment in, and severance of, the leaves by the severing means.

DRAWING

The detasseling apparatus will be further described with reference to the attached drawing, wherein like numbers indicate like parts throughout the figures set forth in the drawing.

DESCRIPTION OF PREFERRED EMBODIMENT

Figure 1:
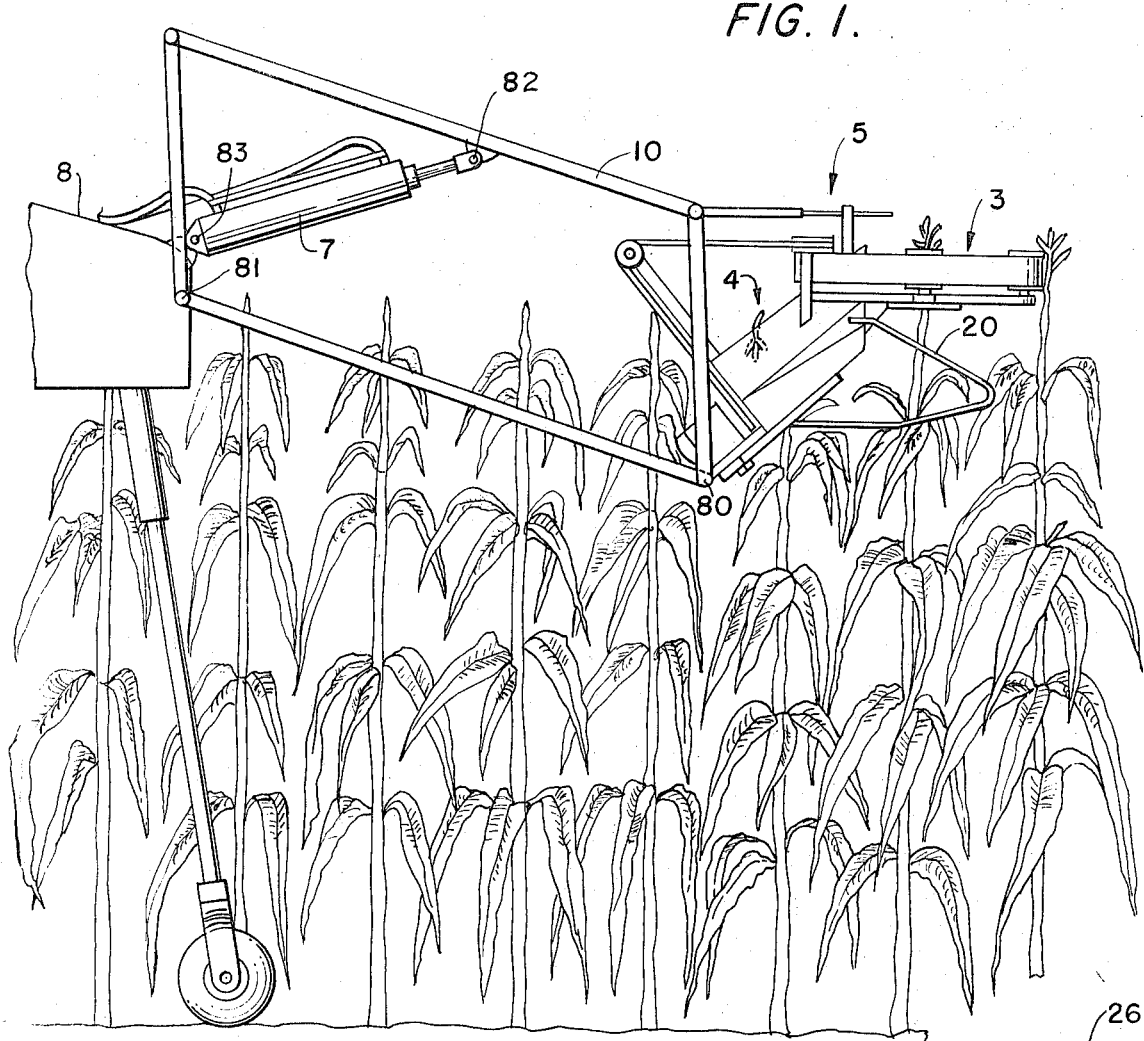
FIG. 1 is a fragmentary side elevation of the apparatus as mounted on a conventional farm implement.

A general understanding of the disclosed invention may be observed by reference to FIG. 1 of the drawing. The entire detasseling apparatus 5 is mounted on a conventional farm implement 8, such as a hy-boy, which is suitable for traversing rows of plants. The detasseling apparatus 5, is rotatably mounted on hydraulic frame 10 at pivot point 80. Hydraulic frame 10 is rotatably mounted on farm implement 8 at pivot point 81. Hydraulic cylinder 7 is rotatably mounted on the upper member of hydraulic frame 10 at pivot point 82, and rotatably mounted on farm implement 8 at pivot point 83, such that the entire detasseling apparatus 5 can be raised and lowered to accommodate the various heights of varied species of corn and like plants by extending or retracting hydraulic cylinder 7. As will be herein described in greater detail with reference to other figures of the drawing, as the detasseling apparatus 5 traverses the plant rows, the upper portion of the tasseled plant is fed into the tassel severing means 4, by feeder belt and pulley system 3, the tassel falling to the ground after severance.

The description of the preferred embodiment of the invention will be set forth by following the movement of the plane stalk through the detasseling apparatus disclosed herein.

Figure 2:
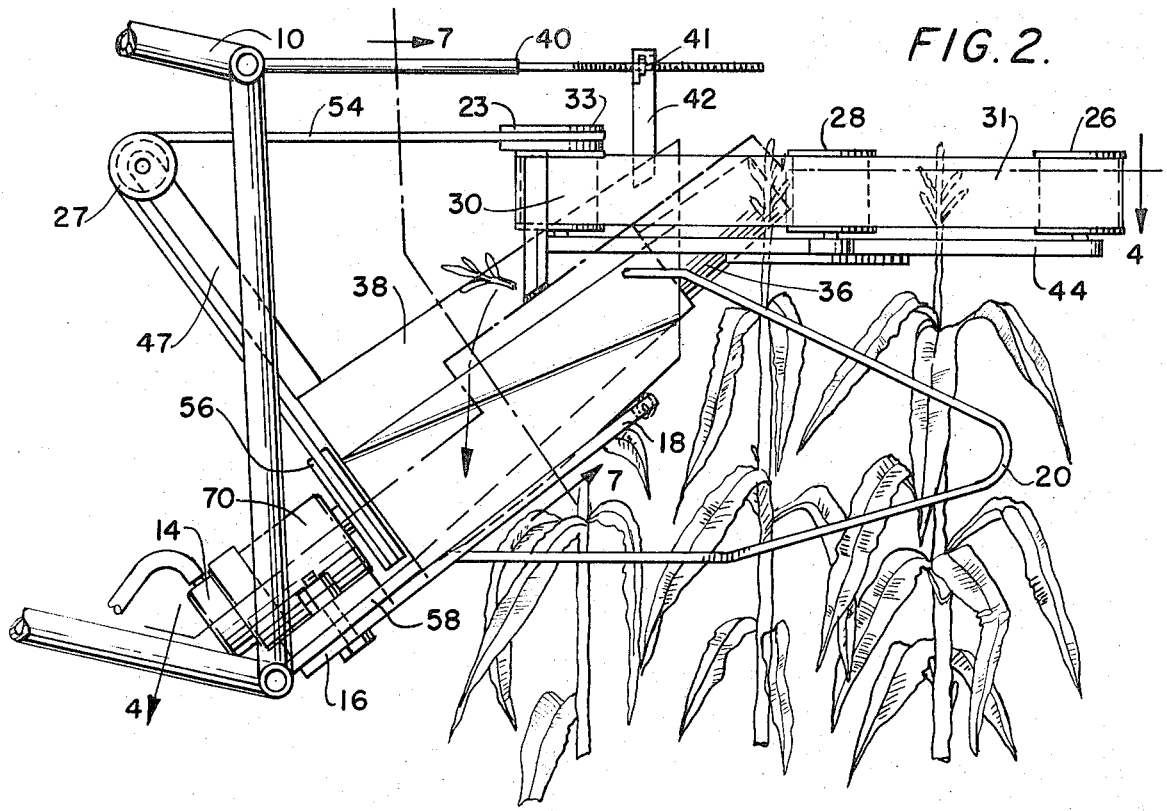
FIG. 2 is an enlarged side elevation of the apparatus.
Figure 3:
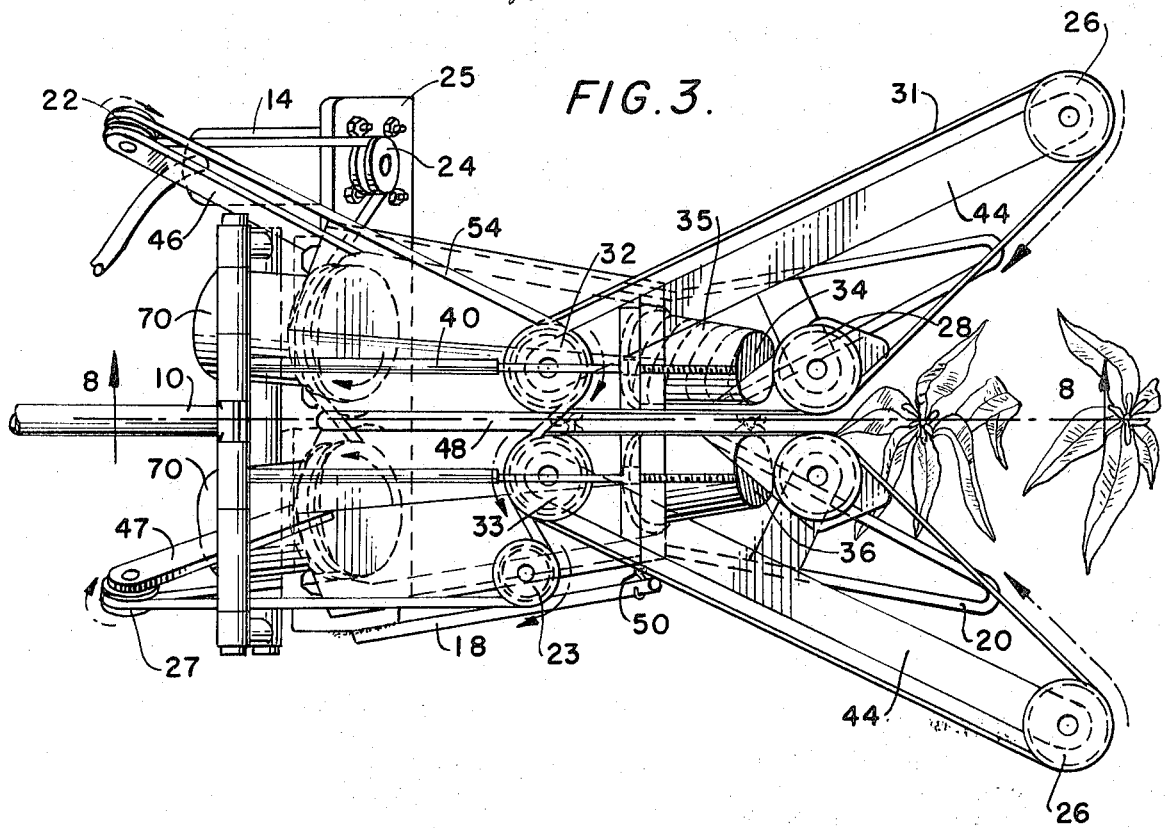
FIG. 3 is a plan view of the apparatus.

Referring to FIGS. 2 and 3 of the drawing, the lower portion of the tasseled plant stalk is directed toward the detasseling apparatus 5 by plant stalk orientation guide rods 20, which are mounted on the conical roller shield 38. Guide rods 20 serve to orient the lower portion of the plant stalk, thus aligning the upper portion of the plant stalk with the feeder belt and pulley system 3. One symmetrical side of the feeder belt and pulley system 3 comprises a flat feeder belt 31, feeder belt guide pulleys 26, 28 and 30. The feeder belt guide pulleys 26, 28 and 30 are mounted on the feeder belt pulley support member 44, said support member being mounted on conical roller shield 38. The flat feeder belt travels in the direction of the arrows illustrated in FIG. 3. Feeder belt guide-drive pulley 30A is integrally connected to feeder belt drive pulley 32. Feeder belt guide-drive pulley 30 is integrally connected to feeder belt drive pulley 33. Rotation of feeder belt guide-drive pulley 30A is imparted by feeder belt drive pulley 32, which is driven by drive belt 54. Rotation of feeder belt guide-drive pulley 30 is imparted by feeder belt drive pulley 33, driven by drive belt 54. The direction of rotation of said feeder belt guide-drive pulley 30 and 30A being designated by arrows in FIG. 3.

The upper portion of the tasseled plant stalk is directed into the tassel severing means by the said flat feeder belt and pulley system 3.

The tassel severing means 4 consists of two rotatably mounted cooperating conical rollers 34 and 36. The said conical rollers increase in circumference from the feeder belt end to the mounting of said conical rollers 34 and 36 on the conical roller mounting plate 58. The cooperating conical rollers are downwardly inclined from the feeder belt end to the mounting end of the conical rollers as illustrated in FIG. 2. The angle of inclination of the conical rollers 34 and 36 can be adjusted by means of threaded tie rod 40 which is rotatably mounted on hydraulic frame 10. As may be seen in FIG. 2, the conical roller mounting plate 58 is also rotatably mounted on hydraulic frame 10. Threaded tie rods 40 extend through two apertures in tie rod plate 42 which is mounted on conical roller shield 38. Adjustment of tie rod lock bolts 41, on threaded tie rod 40, rotates the entire apparatus on hydraulic frame 10. The position of tie rod lock bolts 41, on the threaded tie rods 40, determine the angular displacement of the conical rollers 34 and 36 from the horizontal plane.

Figure 6:
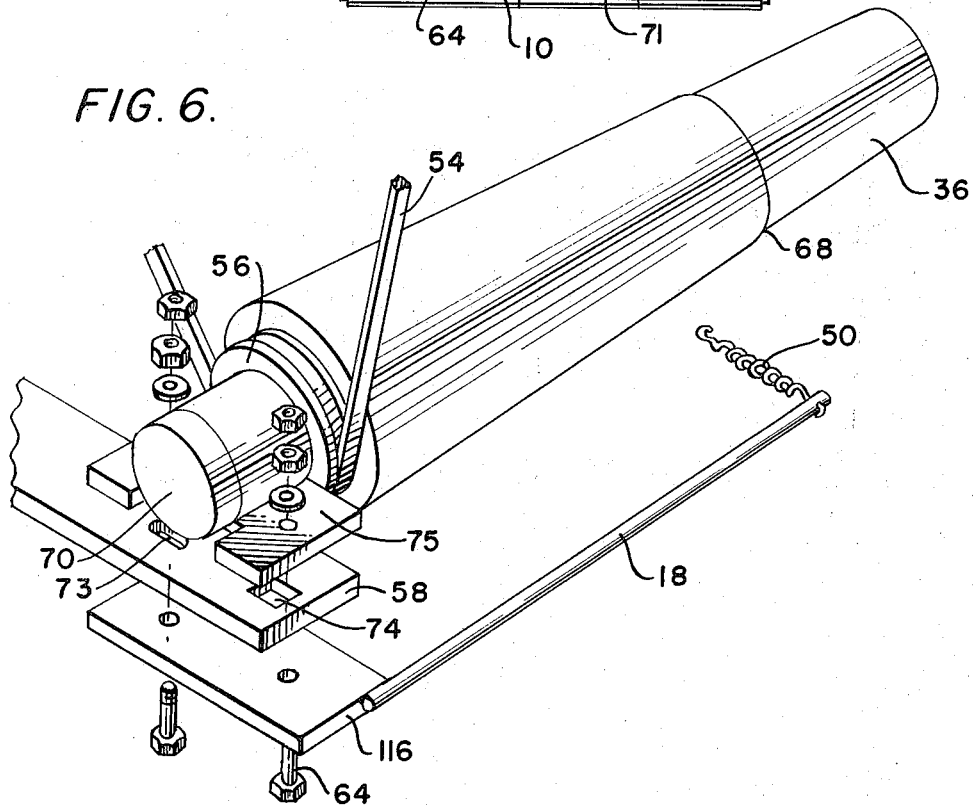
FIG. 6 is a prospective view of the laterally movable conical roller and spring biasing mechanism.

The conical rollers 34 and 36 are circumferentially reduced at the feeder end, as illustrated in FIG. 6 at 68, to allow passage of feeder belt 31, between said conical rollers, when the conical rollers impinge.

Figure 7:
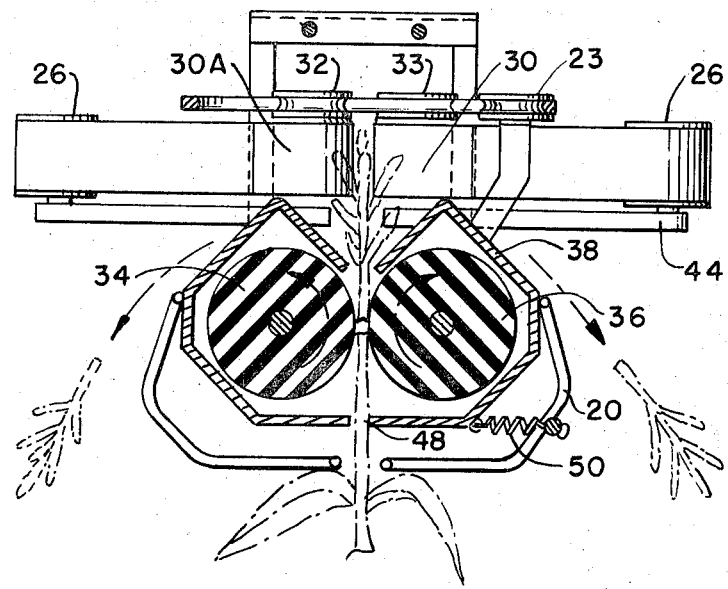
FIG. 7 is a vertical sectional view taken on section line 7—7 of FIG. 2.
Figure 8:
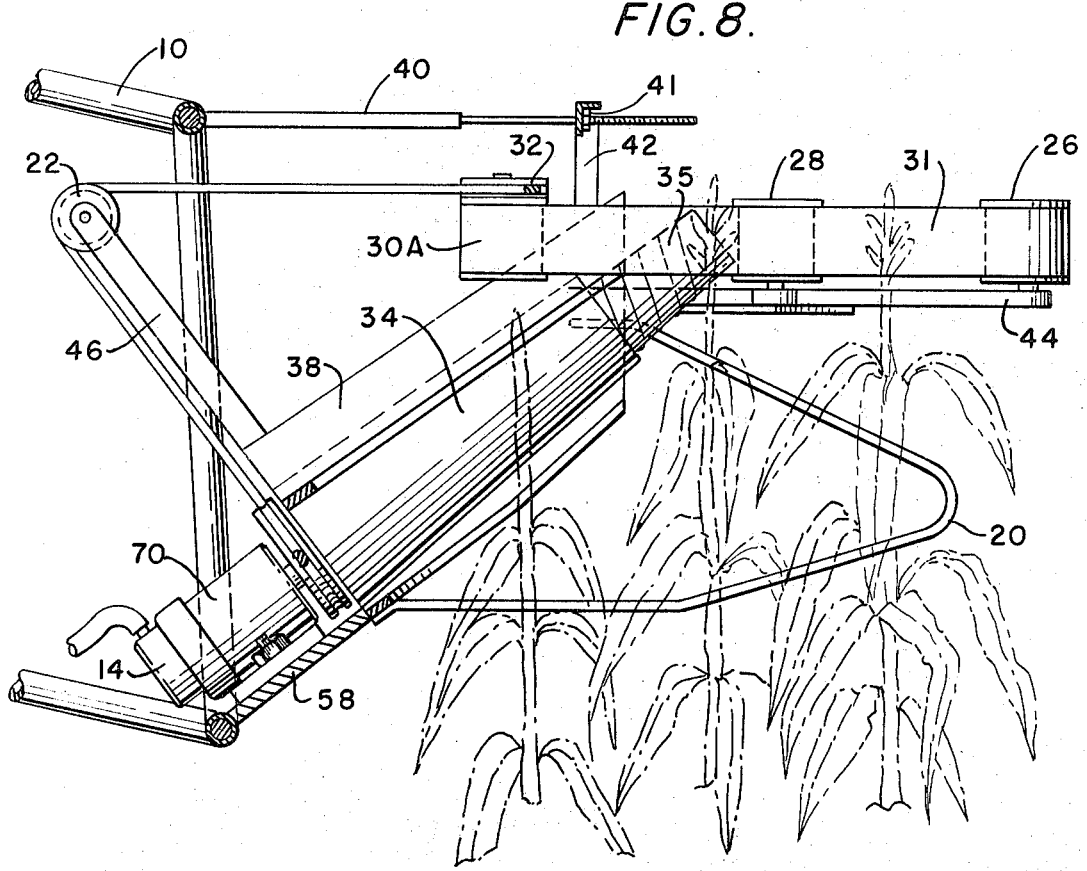
FIG. 8 is a longitudinal vertical sectional view taken on section line 8—8 of FIG. 3.

The upper portion of the tasseled plant enters between the conical rollers 34 and 36, and as the detasseling apparatus 5 moves forward, the increased inches per minute rotation of said conical rollers increases proportionally with the increased circumference of said conical rollers, pulling the tassel portion of the plant from the plant stalk. The top portion of conical roller shield 38 does not enclose, but rather forms a slotted wedge above the said conical rollers as illustrated in FIG. 7. The plant tassel, after severance, follows the downwardly inclined wedge formed by the top of conical roller shield 38 and falls to the ground.

Figure 5:
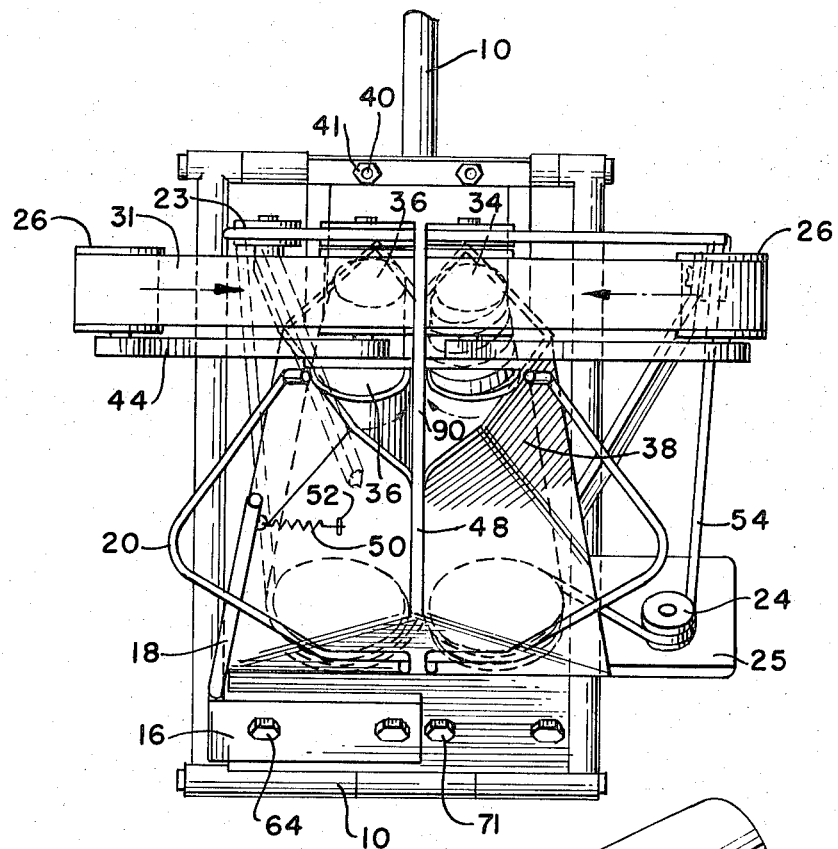
FIG. 5 is a front elevational view of the apparatus.

Conical rollers 34 and 36 are structurally defined as equivalent truncated cones, aligned base to base and apex to apex as mounted on conical roller mounting plate 58. The inner adjacent surfaces of the conical rollers 34 and 36 define a channel of generally constant width 90 as illustrated in FIG. 5. The channel 90 being of a width less than the diameter of the tassel to be severed.

Figure 4:
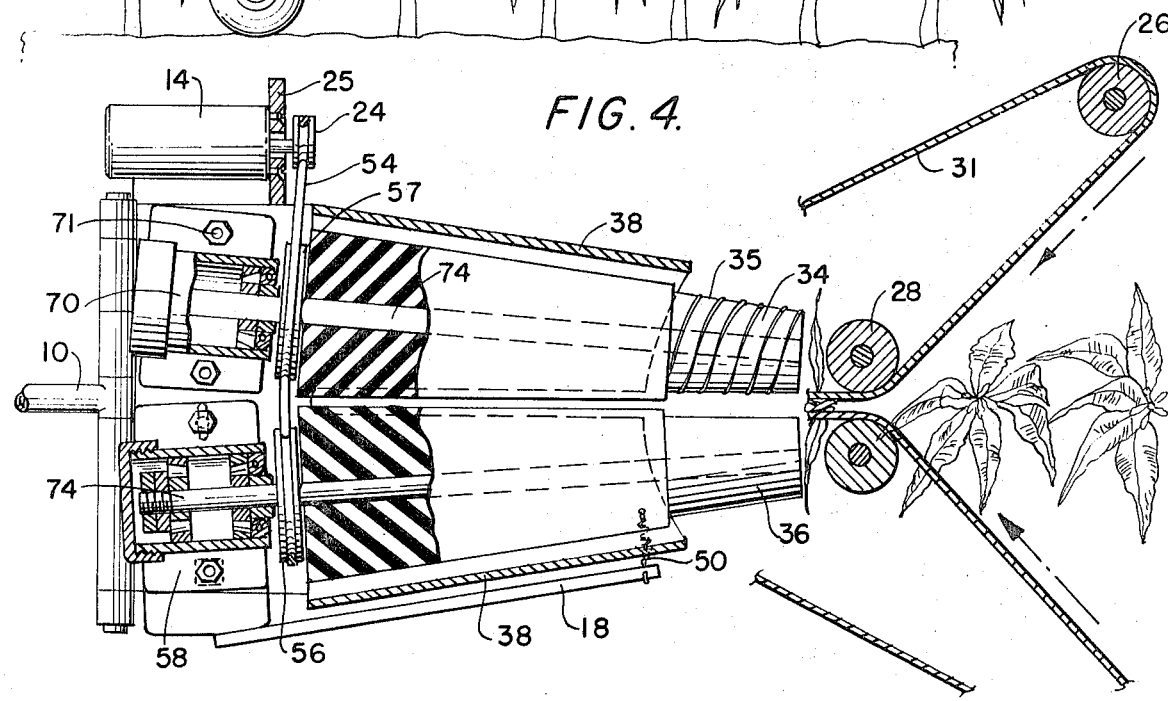
FIG. 4 is a horizontal sectional view taken along section line 4—4 of FIG. 2.

One of the conical rollers 34 has a spiral or roughened surface 35 for approximately 6 inches from the feeder end of said conical roller, as illustrated in FIG. 4. The spiral or roughened surface 35 of roller 34 serves to grasp the upper portion of the tasseled plant stalk, and aid the feeding of the tassel portion of the stalk between the two cooperating conical rollers 34 and 36. The direction of rotation of the said conical rollers is illustrated by arrows in FIG. 7.

The said conical rollers are partially surrounded by conical roller shield 38. The bottom portion of the said conical roller shield forms a slot 48, as illustrated in FIG. 5 and 7. The plant stalk passes through slot 48 during operation of the detasseling apparatus 5. The bottom portion of the conical roller shield 38 and slot 48 cooperate during operation of the apparatus to depress the leaves of the upper portion of the plant stalk to prevent severance of said leaves by entrainment between the conical rollers 34 and 36.

The mounting of conical rollers 34 and 36 on conical roller mounting plate 58, is illustrated in FIG. 4. Conical roller bearing housing 70 of conical roller 34 is mounted on conical roller mounting plate 58 by means of bearing housing bolts 71. Conical roller shaft 74 of conical roller 34 is mounted in bearing housing 70 to allow rotation of conical roller 34 by conical roller drive pulley 57 during operation of the detasseling apparatus 5. It will be noted the conical roller 34 is mounted to conical roller mounting plate 58, such that conical roller 34 is fixed during operation of the detasseling apparatus 5.

One of the conical rollers 36 is mounted on mounting plate 58, to allow said conical roller to oscillate in cooperation with slide plate 116, as illustrated in FIG. 6. Slide plate 116 is attached to lever arm 18. The end of lever arm 18 is attached to shield 38, by means of spring 50. Spring 50 being attached to conical shield 38 by means of spring mounting aperture 52. In operation, spring 50 biases the end of lever arm 18 towards shield 38. The slide plate 16, which cooperates with the bearing housing 70 of conical roller 36, to bias the control roller laterally inward toward the stationary conical roller 34. The biasing of conical roller 36 toward stationary mounted conical roller 34 permits a better cooperation between said conical rollers to grasp and pull the tassel from the plant stalk.

The mounting of conical roller 36 on conical roller mounting plate 58, allowing cooperation between slide plate 116 and bearing housing 70 to bias conical roller 36 laterally toward stationary conical roller 34 is better understood by reference to FIG. 6. Conical roller mounting plate 58 has a slotted bolt aperture 73 and a rectangular bolt aperture 74, such that when bearing housing mounting plate 75, mounting plate 58, and slide plate 16 are joined by bearing bolts 64, bearing plate 75 is movable and is biased inwardly both laterally and pivotally toward stationary conical roller 34 by the biasing of slide plate 16 cooperating with spring biased lever arm 18 and spring 50.

The drive means for the apparatus is demonstrated in FIG. 3. Motor 14 is mounted on motor mounting plate 25 vertical to and integrally connected to conical roller mounting plate 58. The motor 14, in cooperation with drive belt 54, provides the motive power for both the conical rollers 34 and 36 and the feeder belt and pulley system 3. Motor pulley 24 rotates in a clockwise direction. Following the drive belt system from the top view as illustrated in FIG. 3 and 4, in a clockwise direction, the drive belt 54 is vertically displaced over guide pulley 22, mounted on guide pulley extension arm 46, attached to the top of conical roller shield 38.

The drive belt 54 rotates feeder belt drive pulley 32 in a clockwise direction, then feeder belt drive pulley 33, in a counter-clockwise direction. The drive belt 54 then follows guide pulley 23 to guide pulley 27 which, like guide pulley 22, is attached to pulley extension arm 47, mounted on the top of conical roller shield 38.

The drive belt 54 rotates conical roller drive pulley 56, attached to shaft 74 of conical roller 36, rotating said shaft in a clockwise direction. The drive belt 54 rotates conical roller drive pulley 57, attached to shaft 74, of conical roller 34, rotating conical roller 34 in a counter-clockwise direction. The drive belt has then returned to motor drive pulley 24, completing the drive belt system circuit of the detasseling apparatus 5.

The particular embodiment described is capable of modification and the particular embodiment set forth herein does not serve to limit the invention solely to the particular embodiment set forth. The claimed invention engenders any apparatus within the scope and spirit of the invention as described.

I claim:

1. An apparatus for severing tassels from corn and like plants, said apparatus being mountable on a farm implement capable of traversing a row of corn or like plants, and comprising:
    a. a tassel severing means consisting of two rotatably mounted cooperating conical rollers;
    b. said rollers being dimensionally equivalent truncated cones;
    c. said rollers aligned apex to apex and base to base;

d. the adjacent inner surfaces of said rollers defining a channel of generally constant width, said width being less than the diameter of said tassels;

e. said apexes aligned toward the front of said machine to receive the tassels;

f. said rollers inclined downwardly and rearwardly;

g. one of said tassel severing rollers being mounted to allow movement of said roller during operation to bias said roller toward said cooperating roller;

2. The tassel severing apparatus of claim 1, wherein the upper plant portion is directed into the tassel severing means by a feeder belt mechanism, said feeder belt mechanism comprising:

a. a system of flat guide pulleys and a feeder belt;

b. said pulley belt feeder mechanism laterally displaced in front of the tassel severing means to form a V-shape and said flat feeder belt directing the upper portion of the plant into the tassel severing means.

3. The tassel severing means of claim 1 wherein;

a. said conical rollers are downwardly inclined, the downward angle of inclination of said rollers being adjustable by means of two tie rod members;

b. at least one of said conical rollers has a spiral or roughened surface for approximately 6 inches from the feed end of said conical roller to aid feeding the tassel portion of the plant into the inner surface portions of the cooperating conical rollers;

c. said conical rollers being particularly surrounded by a shield means, said shield means having a slot in the bottom portion of the shield parallel to the channel defined by the adjacent surfaces of the two conical rollers, said shield slot serving to depress the leaves of the upper portion of the plant to prevent entrainment and severance of the plant leaves by the said tassel severing means;

d. said roller capable of movement, being mounted on a plate integrally connected with spring biased lever arm, biasing the said roller toward the stationary mounted cooperating conical roller.

* * * * *